US012699920B2

(12) United States Patent
Hanaoka

(10) Patent No.: US 12,699,920 B2
(45) Date of Patent: Aug. 4, 2026

(54) INFORMATION PROCESSING SYSTEM, INFORMATION PROCESSING METHOD, AND STORAGE MEDIUM

(71) Applicant: Resonac Corporation, Tokyo (JP)

(72) Inventor: Kyohei Hanaoka, Tokyo (JP)

( * ) Notice: Subject to any disclaimer, the term of this patent is extended or adjusted under 35 U.S.C. 154(b) by 1030 days.

(21) Appl. No.: 17/774,886

(22) PCT Filed: Nov. 10, 2020

(86) PCT No.: PCT/JP2020/041905
§ 371 (c)(1),
(2) Date: May 6, 2022

(87) PCT Pub. No.: WO2021/095725
PCT Pub. Date: May 20, 2021

(65) Prior Publication Data
US 2022/0405049 A1 Dec. 22, 2022

(30) Foreign Application Priority Data

Nov. 11, 2019 (JP) ................................. 2019-204089

(51) Int. Cl.
*G06N 20/00* (2019.01)
*G06F 17/18* (2006.01)
(52) U.S. Cl.
CPC ............. *G06N 20/00* (2019.01); *G06F 17/18* (2013.01)
(58) Field of Classification Search
CPC ........ G16C 10/00; G16C 20/00; G16C 20/30; G16C 20/70; G16C 60/00; G06F 17/10;
(Continued)

(56) References Cited

U.S. PATENT DOCUMENTS

| 10,790,045 B1 | 9/2020 | Goyal et al. |
| 2006/0235670 A1 | 10/2006 | Vujasinovic |

(Continued)

FOREIGN PATENT DOCUMENTS

| CA | 2800722 | 7/2013 |
| CN | 105778150 | 7/2016 |

(Continued)

OTHER PUBLICATIONS

Liang, Zhilong, et al. "A Machine Learning Method for Material Property Prediction: Example Polymer Compatibility." arXiv.Org, Feb. 28, 2022, arxiv.org/abs/2202.13554. (Year: 2022).*

(Continued)

*Primary Examiner* — Andrew Caldwell
*Assistant Examiner* — Huy Duong
(74) *Attorney, Agent, or Firm* — SHIPWAY IP

(57) ABSTRACT

An information processing system according to an embodiment is configured to: acquire numerical representations and combination ratios for a plurality of component objects; acquire numerical representations for a plurality of reference objects; calculate a plurality of component feature vectors and a plurality of reference feature vectors by inputting the numerical representations of each of the plurality of component objects and the plurality of reference objects into a first machine learning model; calculate a probability vector for each of the plurality of component objects by inputting those feature vectors into a second machine learning model; and calculate a composite feature vector for a composite object obtained by combining the plurality of component objects, based on a plurality of probability vectors and a plurality of combination ratios.

4 Claims, 4 Drawing Sheets

(58) Field of Classification Search

CPC .......... G06F 17/11; G06F 17/16; G06F 17/18; G06F 17/40; G06F 30/10; G06F 30/27; G06N 7/00–01; G06N 20/00; G06N 20/10; G06N 3/047; G06N 3/044; G06N 3/0464; G06N 3/02; G06N 3/08; G06N 3/045; G06N 3/0475; G06N 3/0442; G06N 3/04; G06N 3/0495; G06N 3/0499; G06N 3/0455; G06N 3/0895; G06N 3/09; G06N 3/091; G06N 3/092; G06N 3/094; G06N 3/096; G06N 3/098; G06N 3/0985; G16B 5/20

See application file for complete search history.

(56) References Cited

U.S. PATENT DOCUMENTS

| | | | |
|---|---|---|---|
| 2013/0179187 | A1 | 7/2013 | Jackson et al. |
| 2017/0076041 | A1 | 3/2017 | Zhou et al. |
| 2018/0360313 | A1 | 12/2018 | Zhang |
| 2019/0286791 | A1 | 9/2019 | Takeda et al. |
| 2020/0160940 | A1 | 5/2020 | Lafon |
| 2020/0257933 | A1* | 8/2020 | Steingrimsson .......... B22F 5/04 |
| 2021/0073671 | A1 | 3/2021 | Puri et al. |
| 2022/0405049 | A1 | 12/2022 | Hanaoka |
| 2023/0051237 | A1* | 2/2023 | Souly .................... G06T 7/0004 |
| 2024/0311692 | A1* | 9/2024 | Tai ........................ C08L 101/00 |
| 2025/0174314 | A1 | 5/2025 | Triendl et al. |

FOREIGN PATENT DOCUMENTS

| | | |
|---|---|---|
| CN | 107111786 | 8/2017 |
| CN | 107969156 | 4/2018 |
| CN | 109870533 | 6/2019 |
| JP | H7-227832 | 8/1995 |
| JP | H8-006646 | 1/1996 |
| JP | H8-512159 | 12/1996 |
| JP | H9-259156 | 10/1997 |
| JP | H10-055348 | 2/1998 |
| JP | 2001-045307 | 2/2001 |
| JP | 2001-256420 | 9/2001 |
| JP | 2003-058582 | 2/2003 |
| JP | 2004-053440 | 2/2004 |
| JP | 2004-086892 | 3/2004 |
| JP | 2015-060237 | 3/2015 |
| JP | 2018-168580 | 11/2018 |
| JP | 2019-008571 | 1/2019 |
| JP | 2019-028879 | 2/2019 |
| JP | 2019-179319 | 10/2019 |
| KR | 20160037512 | 4/2016 |
| WO | 97/017659 | 5/1997 |
| WO | 2018/084974 | 5/2018 |
| WO | 2018/168580 | 9/2018 |
| WO | 2019/099944 | 5/2019 |
| WO | 2019/198644 | 10/2019 |
| WO | 2020/004575 | 1/2020 |

OTHER PUBLICATIONS

International Search Report dated Mar. 16, 2021 for PCT/JP2021/003767.

SOEI Patent and Law Firm, Statement of Related Matters, dated Aug. 26, 2022.

International Preliminary Report on Patentability with Written Opinion dated Sep. 1, 2022 for PCT/JP2021/003767.

Kyohei Hanaoka, "Deep Neural Networks for Multicomponent Molecular Systems", ACS OMEGA, vol. 5, No. 33, Aug. 10, 2020, p. 21042-p. 21053.

Dipendra Jha et al., "ElemNet: Deep Learning the Chemistry of Materials From Only Elemental Composition", Scientific Reports, vol. 8, No. 1, Dec. 4, 2018.

Dipendra Jha et al., "IRNet: A General Purpose Deep Residual Regression Framework for Materials Discovery", CCS '18: Proceedings of the 2018 ACM SIGSAC Conference on Computer and Communications Security, ACM PRSS, New York, New York, USA, Jul. 25, 2019, p. 2385-p. 2393.

Elham Torabian et al., "New structure-based models for the prediction of flash point of multi-component organic mixtures", Thermochimica Acta, vol. 672, Nov. 16, 2018, p. 162-p. 172.

Rhys E. A. Goodall et al., "Predicting materials properties without crystal structure: Deep representation learning from stoichiometry", arxiv.org, Cornell University Library, 201 Olin Library Cornell University Ithaca, NY 14853, Oct. 1, 2019.

Extended Search Report in corresponding European Application No. 21757917.6, dated Jul. 3, 2023.

Amitava Choudhury et al., "Structure prediction of multi-principal element alloys using ensemble learning", Engineering Computations, vol. 37, No. 3, Oct. 8, 2019, p. 1003-p. 1022.

Han Min et al., "A Model for the Components of Materials Based on Neural Network Method", Journal of Building Materials, vol. 5, No. 4, Dec. 25, 2002.

International Search Report dated Jan. 19, 2021 for PCT/JP2020/041902.

International Search Report dated Jan. 19, 2021 for PCT/JP2020/041905.

International Search Report dated Feb. 16, 2021 for PCT/JP2020/041973.

SOEI Patent and Law Firm, Statement of Related Matters, dated Jun. 2, 2022.

Lin Tzyy-Shyang et al., "BigSMILES: A Structurally-Based Line Notation for Describing Macromolecules", ACS Central Science, vol. 5, No. 9, Sep. 12, 2019, p. 1523-p. 1531.

Minggang Zeng et al., "Graph Convolutional Neural Networks for Polymers Property Prediction", arxiv.org, Cornell University Library, 201 Olin Library Cornell University Ithaca, NY 14853, Nov. 15, 2018.

Oprisiu et al., "QSPR Approach to Predict Nonadditive Properties of Mixtures. Application to Bubble Point Temperatures of Binary Mixtures of Liquids", Molecular Informatics, vol. 31, No. 6-7, Jul. 6, 2012, p. 491-p. 502.

Extended Search Report in corresponding European Application No. 20886745.7, dated Mar. 2, 2023.

Wang Yu, et al., "Practical Technology and Application of Plastic Modification", Printing Industry Press, Jun. 30, 2014.

Connor W. Coley et al., "Machine Learning in Computer-Aided Synthesis Planning", Accounts of Chemical Research, vol. 51, No. 5, May 1, 2018.

Lu Yanqiu et al., "Research on Molecular Weight and Distribution of Polyester during Polymerization Process", Coatings Technology & Abstracts, vol. 38, No. 2, Feb. 28, 2017.

Pilania Ghanshyam et al, "Machine-Learning-Based Predictive Modeling of Glass Transition Temperatures: A Case of Polyhydroxyalkanoate Homopolymers and Copolymers", Journal of Chemical Information and Modeling, vol. 59, No. 12, Nov. 7, 2019, p. 5013-p. 5025.

Jinchao Liu et al, "Dynamic Spectrum Matching with One-shot Learning", arxiv.org, Cornell University Library, 201 Olin Library Cornell University Ithaca, NY 14853, Jun. 23, 2018.

Altae-Tran Han et al, "Low Data Drug Discovery with One-Shot Learning", ACS Central Science, vol. 3, No. 4, Apr. 26, 2017, p. 283-p. 293.

Jeon Minji et al, "ReSimNet: drug response similarity prediction using Siamese neural networks", Bioinformatics, vol. 35, No. 24, May 22, 2019, p. 5249-p. 5256.

Extended Search Report in corresponding European Application No. 20886405.8 dated Mar. 16, 2023.

Extended Search Report in corresponding European Application No. 20887729.0 dated Mar. 16, 2023.

International Preliminary Report on Patentability with Written Opinion dated May 27, 2022 for PCT/JP2020/041902.

International Preliminary Report on Patentability with Written Opinion dated May 27, 2022 for PCT/JP2020/041905.

International Preliminary Report on Patentability with Written Opinion dated May 27, 2022 for PCT/JP2020/041973.

(56)         References Cited

OTHER PUBLICATIONS

Rhys E. A Goodall and Alpha A. Lee, "Predicting materials properties without crystal structure:Deep representation learning from stoichiometry", arXiv.Org, https://arxiv.org/abs/1910.00617v2, Oct. 29, 2019, P1-P8.

* cited by examiner

INFORMATION PROCESSING SYSTEM, INFORMATION PROCESSING METHOD, AND STORAGE MEDIUM

CROSS-REFERENCE TO RELATED APPLICATIONS

This application is a 35 U.S.C. § 371 national phase application of PCT/JP2020/041905, filed on Nov. 10, 2020, which claims priority to Japanese Patent Application No. 2019-204089, filed on Nov. 11, 2019.

TECHNICAL FIELD

One aspect of the present disclosure relates to an information processing system, an information processing method, and an information processing program.

BACKGROUND ART

A method of analyzing a composite object obtained by combining a plurality of component objects using machine learning has been used. For example, Patent Literature 1 describes a method of predicting the bondability between the three-dimensional structure of a biopolymer and the three-dimensional structure of a compound. This method includes: generating a predicted three-dimensional structure of a complex of a biopolymer and a compound based on the three-dimensional structure of the biopolymer and the three-dimensional structure of the compound; converting the predicted three-dimensional structure into a predicted three-dimensional structure vector representing a result of comparison with an interaction pattern; and predicting the bondability between the three-dimensional structure of the biopolymer and the three-dimensional structure of the compound by determining the predicted three-dimensional structure vector using a machine learning algorithm.

CITATION LIST

Patent Literature

Patent Literature 1: JP 2019-28879 A

SUMMARY OF INVENTION

Technical Problem

When there are various or many component objects, it is not possible to prepare a sufficient amount of data for these component objects. As a result, the accuracy of analysis of a composite object may not reach the expected level. Therefore, there has been a demand for a mechanism for improving the accuracy of analysis of a composite object even in a case where a sufficient amount of data cannot be prepared for component objects.

Solution to Problem

An information processing system according to one aspect of the present disclosure includes at least one processor. The at least one processor is configured to: acquire a numerical representation and a combination ratio for each of a plurality of component objects; acquire a numerical representation for each of a plurality of reference objects; calculate a component feature vector of each of the plurality of component objects and a reference feature vector of each of the plurality of reference objects by inputting a plurality of the numerical representations corresponding to the plurality of component objects and a plurality of the numerical representations corresponding to the plurality of reference objects into a first machine learning model; calculate a probability vector indicating a degree of association with each of the plurality of reference objects, for each of the plurality of component objects, by inputting a plurality of the component feature vectors and a plurality of the reference feature vectors into a second machine learning model; calculate a composite feature vector indicating a degree of association with each of the plurality of reference objects, for a composite object obtained by combining the plurality of component objects, based on a plurality of the probability vectors and a plurality of the combination ratios; and output the composite feature vector.

In such an aspect, features of each component object configuring the composite object are clarified by using the degree of association with each reference object, before considering the combination ratio. It is therefore possible to improve the accuracy of analysis of composite object even in a case where a sufficient amount of data cannot be prepared for the component objects.

Advantageous Effects of Invention

According to one aspect of the present disclosure, it is possible to improve the accuracy of analysis of composite object even in a case where a sufficient amount of data cannot be prepared for the component objects.

DESCRIPTION OF EMBODIMENTS

Figure 1:
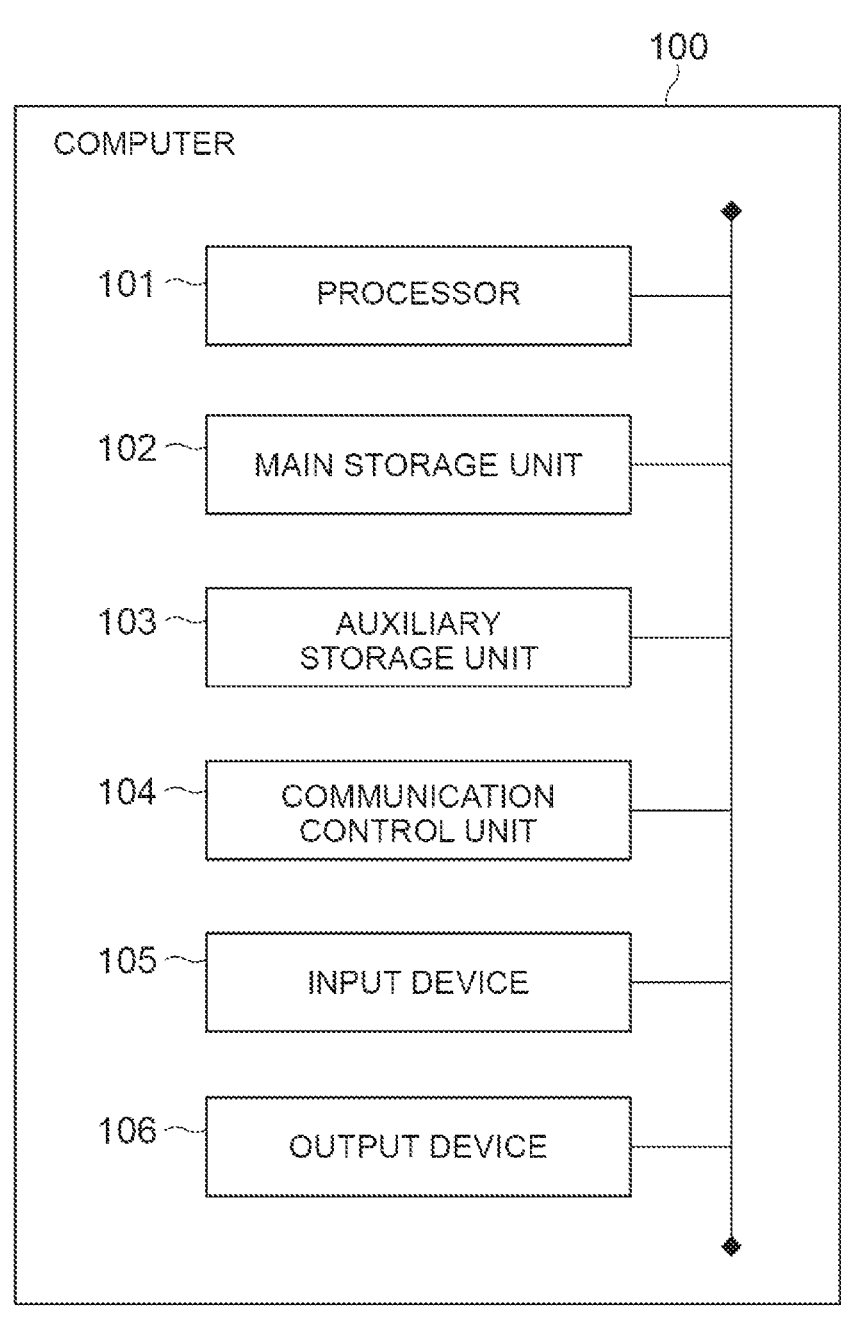
FIG. 1 is a diagram showing an example of the hardware configuration of a computer configuring an information processing system according to an embodiment.

Hereinafter, an embodiment in the present disclosure will be described in detail with reference to the accompanying diagrams. In addition, in the description of the diagrams, the same or equivalent elements are denoted by the same reference numerals, and the repeated description thereof will be omitted.

System Overview

An information processing system 10 according to the embodiment is a computer system that performs an analysis on a composite object obtained by combining a plurality of component objects at a predetermined combination ratio. A component object refers to a tangible object or an intangible object used to generate a composite object. The composite object can be a tangible object or an intangible object. Examples of a tangible object include any substance or object. Examples of an intangible object include data and information. "Combining a plurality of component objects" refers to a process of making a plurality of component objects into one object, that is, a composite object. The method of combining is not limited, and may be, for example, compounding, blending, synthesis, bonding, mixing, merging, combination, chemical combination, or uniting, or other methods. The analysis of a composite object refers to a process for obtaining data indicating a certain feature of the composite object.

The plurality of component objects may be any plurality of types of materials. In this case, the composite object is a multi-component substance produced by these materials. The materials are arbitrary components used to produce a multi-component substance. For example, the plurality of materials may be any plurality of types of molecules or atomic materials. In this case, the composite object is a multi-component substance obtained by combining these molecules or atoms using an arbitrary method. For example, the material may be a polymer and correspondingly the multi-component substance may be a polymer alloy. The material may be a monomer and correspondingly the multi-component substance may be a polymer. The material may be a medicinal substance, that is, a chemical substance having a pharmacological action, and correspondingly, the multi-component substance may be a medicine.

The information processing system 10 performs machine learning for the analysis of a composite object. The machine learning is a method of autonomously finding a law or rule by learning based on given information. The specific method of machine learning is not limited. For example, the information processing system 10 may perform machine learning using a machine learning model that is a calculation model configured to include a neural network. The neural network is an information processing model that imitates the mechanism of the human cranial nerve system. As a more specific example, the information processing system 10 may perform machine learning by using at least one of graph neural network (GNN), convolutional neural network (CNN), recurrent neural network (RNN), attention RNN, and multi-head attention.

System Configuration

The information processing system 10 is configured to include one or more computers. In a case where a plurality of computers are used, one information processing system 10 is logically constructed by connecting these computers to each other through a communication network, such as the Internet or an intranet.

FIG. 1 is a diagram showing an example of a general hardware configuration of a computer 100 configuring the information processing system 10. For example, the computer 100 includes a processor (for example, a CPU) 101 for executing an operating system, an application program, and the like, a main storage unit 102 configured by a ROM and a RAM, an auxiliary storage unit 103 configured by a hard disk, a flash memory, and the like, a communication control unit 104 configured by a network card or a wireless communication module, an input device 105 such as a keyboard and a mouse, and an output device 106 such as a monitor.

Each functional element of the information processing system 10 is realized by reading a predetermined program on the processor 101 or the main storage unit 102 and causing the processor 101 to execute the program. The processor 101 operates the communication control unit 104, the input device 105, or the output device 106 according to the program and performs reading and writing of data in the main storage unit 102 or the auxiliary storage unit 103. The data or database required for the processing is stored in the main storage unit 102 or the auxiliary storage unit 103.

Figure 2:
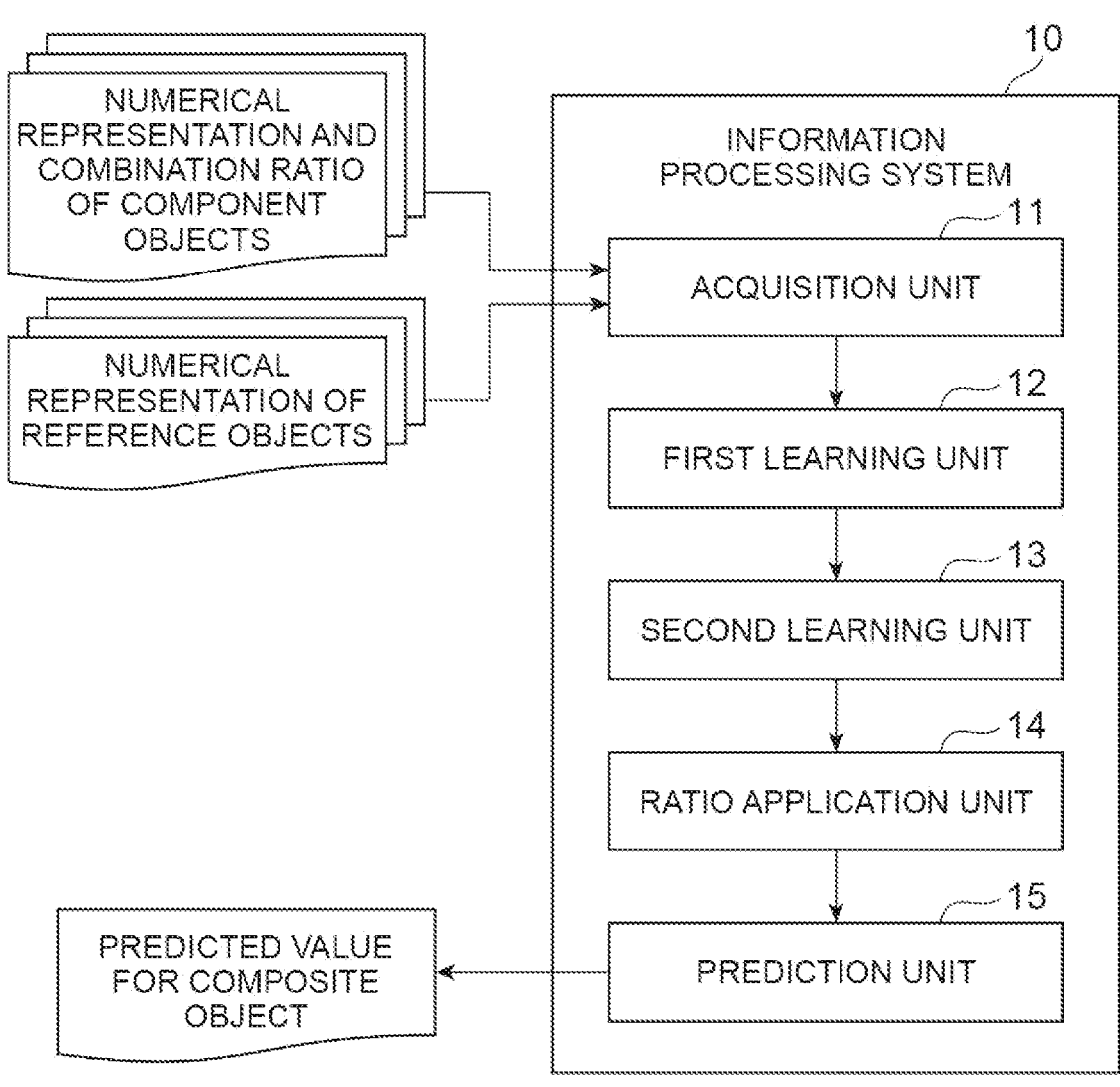
FIG. 2 is a diagram showing an example of the functional configuration of the information processing system according to the embodiment.

FIG. 2 is a diagram showing an example of the functional configuration of the information processing system 10. The information processing system 10 includes an acquisition unit 11, a first learning unit 12, a second learning unit 13, a ratio application unit 14, and a prediction unit 15 as functional elements.

The acquisition unit 11 is a functional element for acquiring data relevant to a plurality of component objects and data relevant to a plurality of reference objects. The reference object refers to a tangible object or an intangible object set corresponding to the component object. More specifically, the reference object refers to an object belonging to the same type or category as the component object. Therefore, the plurality of reference objects may be any plurality of types of materials. For example, the plurality of reference objects may be polymers, monomers, or medicinal substances.

The acquisition unit 11 acquires a numerical representation and a combination ratio for each of the plurality of component objects. In addition, the acquisition unit 11 acquires a numerical representation for each of a plurality of reference objects. The numerical representation of a component object (or a reference object) refers to data representing arbitrary attributes of the component object (or the reference object) using a plurality of numerical values. The attributes of the component object (or the reference object) refer to the properties or features of the component object (or the reference object). In the present disclosure, the numerical representation of the component object is also referred to as a "component numerical representation", and the numerical representation of the reference object is also referred to as a "reference numerical representation". The numerical representation may be visualized by various methods. For example, the numerical representation may be visualized by methods such as numbers, letters, texts, molecular graphs, vectors, images, time-series data, and the like or may be visualized by any combination of two or more of these methods. Each numerical value that makes up the numerical representation may be represented in decimal or may be represented in other notations such as a binary notation and a hexadecimal notation. The combination ratio of component objects refers to a ratio between a plurality of component objects. The specific type, unit, and representation method of the combination ratio are not limited, and may be arbitrarily determined depending on the component object or the composite object. For example, the combination ratio may be represented by a ratio such as a percentage or by a histogram, or may be represented by an absolute amount of each component object.

The number of component objects and the number of reference objects may be the same or different. The number of component objects may be greater than or less than the number of reference objects.

The first learning unit 12 is a functional element that calculates, for each of a plurality of component objects and a plurality of reference objects, a vector indicating the features of the object by first machine learning using a first machine learning model. The vector indicating features of the component object is referred to as a component feature vector, and the vector indicating features of the reference object is referred to as a reference feature vector. The features of the component object (or the reference object) refer to any elements that make the component object (or the reference object) different from other objects. The vector refers to an n-dimensional quantity having n numerical values, and may be expressed as a one-dimensional array.

The second learning unit 13 is a functional element that calculates a probability vector indicating the degree of association with each of a plurality of reference objects, for each of a plurality of component objects, by second machine learning using a second machine learning model. The probability vector is a vector indicating how much the component object is associated with each reference object. In other words, the probability vector is a vector indicating a degree to which the component object belongs to each reference object. The degree of association is an index indicating the strength of the association between the component object and the reference object. In other words, the degree of association is an index indicating a degree to which the component object belongs to the reference object.

The ratio application unit 14 is a functional element that calculates a composite feature vector indicating features of a composite object, based on a plurality of probability vectors corresponding to a plurality of component objects and the combination ratio of each component object. The features of the composite object refer to arbitrary elements that make the composite object different from other objects. Specifically, the composite feature vector indicates a degree of association with each of a plurality of reference objects.

The prediction unit 15 is a functional element that predicts characteristics of the composite object and outputs the predicted value. The characteristics of the composite object refer to unique properties of the composite object.

In one example, both the first and second machine learning models are trained models that are expected to have the highest estimation accuracy, and therefore can be referred to as "best machine learning models". However, it should be noted that the trained model is not always "best in reality". The trained model is generated by processing training data including many combinations of input vectors and labels with a given computer. The given computer calculates an output vector by inputting the input vector into the machine learning model, and obtains an error between a predicted value obtained from the calculated output vector and a label indicated by training data (that is, a difference between the estimation result and the ground truth). Then, the computer updates a predetermined parameter in the machine learning model based on the error. The computer generates a trained model by repeating such learning. The computer that generates a trained model is not limited, and may be, for example, the information processing system 10 or another computer system. The process of generating the trained model can be referred to as a learning phase, and the process of using the trained model can be referred to as an operation phase.

Data

As described above, each component object and each reference object may be a material, and the composite object may be a multi-component substance. In this case, the component numerical representation and the reference numerical representation may include a numerical value indicating the chemical structure of the material, or may include a numerical value indicating a configuration repetition unit (CRU) of the chemical structure of the material. The combination ratio may be a compounding ratio or a mixing ratio. The predicted value of the characteristics of the composite object (multi-component substance) may indicate at least one of the glass transition temperature (Tg) and elastic modulus of the multi-component substance.

Operation of System

The operation of the information processing system 10 and the information processing method according to the

Figure 3:
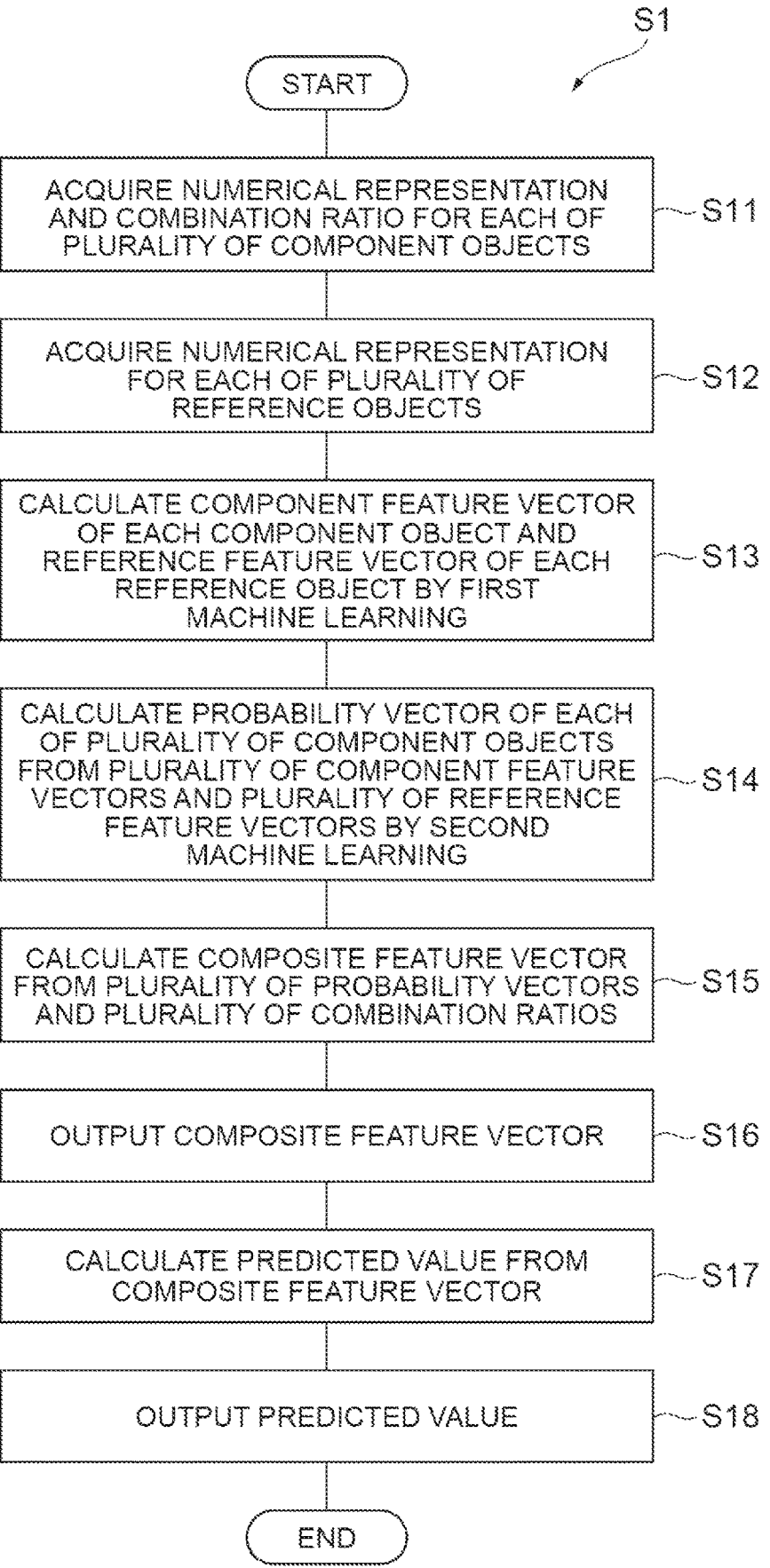
FIG. 3 is a flowchart showing an example of an operation of the information processing system according to the embodiment.
Figure 4:
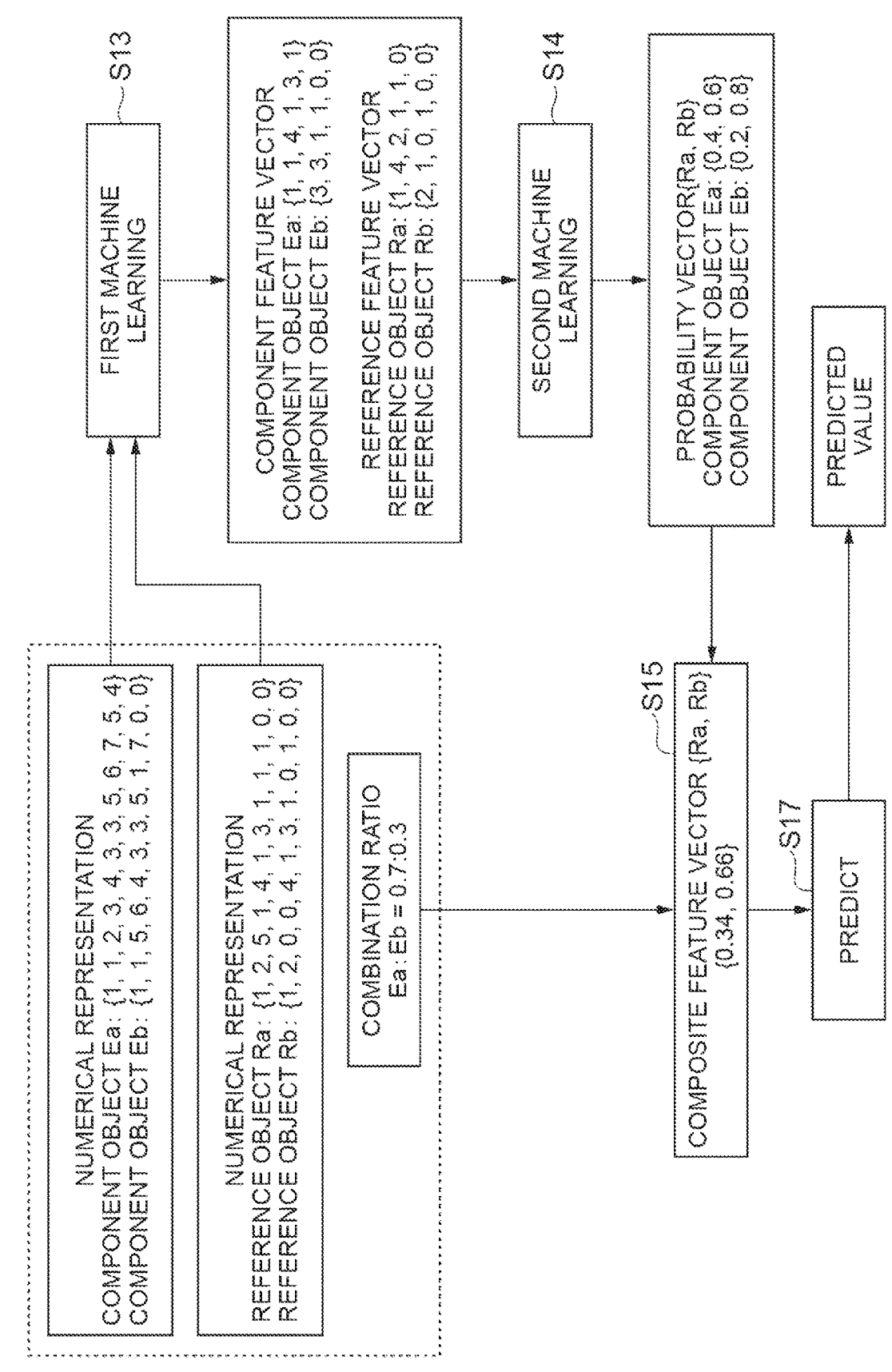
FIG. 4 is a diagram describing the operation of the information processing system according to the embodiment by using a specific example of data.

6 present embodiment will be described with reference to FIGS. 3 and 4. FIG. 3 is a flowchart showing an example of the operation of the information processing system 10 as a processing flow S1. FIG. 4 is a diagram showing the operation of the information processing system 10 by using a specific example of data.

In step S11, the acquisition unit 11 acquires a numerical representation (component numerical representation) and a combination ratio for each of a plurality of component objects. FIG. 4 shows two component objects Ea and Eb as examples of the plurality of component objects. The numerical representation of the component object Ea is $\{1, 1, 2, 3, 4, 3, 3, 5, 6, 7, 5, 4\}$, and the numerical representation of the component object Eb is $\{1, 1, 5, 6, 4, 3, 3, 5, 1, 7, 0, 0\}$. The combination ratios of the component objects Ea and Eb are 0.7 and 0.3, respectively. This therefore means that the component objects Ea and Eb are used in a ratio of 7:3 to obtain a composite object.

In step S12, the acquisition unit 11 acquires a numerical representation (reference numerical representation) for each of the plurality of reference objects. FIG. 4 shows two reference objects Ra and Rb as examples of the plurality of reference objects. The numerical representation of the reference object Ra is $\{1, 2, 5, 1, 4, 1, 3, 1, 1, 1, 0, 0\}$, and the numerical representation of the reference object Rb is $\{1, 2, 0, 0, 4, 1, 3, 1, 0, 1, 0, 0\}$.

In the example of FIG. 4, the number of component objects and the number of reference objects are the same. However, as described above, the number of component objects and the number of reference objects may be different. In the example of FIG. 4, the number of dimensions of the numerical representation is the same between the component object and the reference object. However, the number of dimensions may be different between the component object and the reference object.

The acquisition unit 11 may acquire the data of the plurality of component objects and the plurality of reference objects by using any method. For example, the acquisition unit 11 may read data by accessing a given database, or may receive data from another computer or computer system, or may receive data input by the user of the information processing system 10. Alternatively, the acquisition unit 11 may acquire data by any two or more of these methods.

In step S13, the first learning unit 12 calculates a component feature vector of each component object and a reference feature vector of each reference object by the first machine learning.

The first learning unit 12 calculates a component feature vector of each of the plurality of component objects by inputting a plurality of numerical representations (component numerical representations) corresponding to the plurality of component objects into the first machine learning model. In one example, the first learning unit 12 calculates, for each of the plurality of component objects, the component feature vector of the component object by inputting the numerical representation corresponding to the component object into the first machine learning model.

In addition, the first learning unit 12 calculates a reference feature vector of each of the plurality of reference objects by inputting a plurality of numerical representations (reference numerical representations) corresponding to the plurality of reference objects into the first machine learning model. In one example, the first learning unit 12 calculates, for each of the plurality of reference objects, a reference feature vector of the reference object by inputting the numerical representation corresponding to the reference object into the first machine learning model.

The first machine learning model is not limited, and may be determined according to an any policy in consideration of factors such as the types of the component object and the reference object. For example, the first learning unit 12 may perform the first machine learning by using the graph neural network (GNN), the convolutional neural network (CNN), or the recurrent neural network (RNN).

The first machine learning model into which the numerical representation corresponding to the component object is input and the first machine learning model into which the numerical representation corresponding to the reference object is input may be the same or different. In the present disclosure, it should be noted that "inputting a plurality of numerical representations corresponding to a plurality of component objects and a plurality of numerical representations corresponding to a plurality of reference objects into the first machine learning model" is a concept including both a case where the first machine learning model for the component object and the first machine learning model for the reference object are the same and a case where the first machine learning model for the component object and the first machine learning model for the reference object are different.

In the example of FIG. 4, the first learning unit 12 calculates a component feature vector $\{1, 1, 4, 1, 3, 1\}$ by inputting the numerical representation $\{1, 1, 2, 3, 4, 3, 3, 5, 6, 7, 5, 4\}$ of the component object Ea into the first machine learning model. In addition, the first learning unit 12 calculates a component feature vector $\{3, 3, 1, 1, 0, 0\}$ by inputting the numerical representation $\{1, 1, 5, 6, 4, 3, 3, 5, 1, 7, 0, 0\}$ of the component object Eb into the first machine learning model. The first learning unit 12 calculates a reference feature vector $\{1, 4, 2, 1, 1, 0\}$ by inputting the numerical representation $\{1, 2, 5, 1, 4, 1, 3, 1, 1, 1, 0, 0\}$ of the reference object Ra into the first machine learning model. In addition, the first learning unit 12 calculates a reference feature vector $\{2, 1, 0, 1, 0, 0\}$ by inputting the numerical representation $\{1, 2, 0, 0, 4, 1, 3, 1, 0, 1, 0, 0\}$ of the reference object Rb into the first machine learning model. In the example of FIG. 4, the number of dimensions is the same between the component feature vector and the reference feature vector. However, the number of dimensions may be different between the component feature vector and the reference feature vector.

In step S14, the second learning unit 13 calculates a probability vector of each of the plurality of component objects from the plurality of component feature vectors and the plurality of reference feature vectors by the second machine learning. In one example, the second learning unit 13 calculates, for each of the plurality of component objects, the probability vector of the component object by inputting a combination of a component feature vector corresponding to the component object and a set of a plurality of reference feature vectors into the second machine learning model. The probability vector of each component object is configured by a plurality of numerical values (vector components) corresponding to the plurality of reference objects. The number of dimensions of the probability vector matches the number of reference objects. The second machine learning model is not limited, and may be determined according to an any policy in consideration of factors such as the types of component objects and reference objects. For example, the second machine learning model may be a learning model that can consider the influence of a combination of elements of the set, or may be a learning model that cannot consider the influence. Examples of the former include the attention RNN and the multi-head attention.

In the example of FIG. 4, the second learning unit 13 calculates a probability vector $\{0.4, 0.6\}$ of the component object Ea by inputting the component feature vector $\{1, 1, 4, 1, 3, 1\}$ of the component object Ea, the reference feature vector $\{1, 4, 2, 1, 1, 0\}$ of the reference object Ra, and the reference feature vector $\{2, 1, 0, 1, 0, 0\}$ of the reference object Rb into the second machine learning model. This probability vector indicates that the degree of association between the component object Ea and the reference object Ra is 0.4 and the degree of association between the component object Ea and the reference object Rb is 0.6.

In addition, the second learning unit 13 calculates a probability vector $\{0.2, 0.8\}$ of the component object Eb by inputting the component feature vector $\{3, 3, 1, 1, 0, 0\}$ of the component object Eb, the reference feature vector of the reference object Ra, and the reference feature vector of the reference object Rb into the second machine learning model. This probability vector indicates that the degree of association between the component object Ea and the reference object Ra is 0.2 and the degree of association between the component object Ea and the reference object Rb is 0.8.

In step S15, the ratio application unit 14 generates a composite feature vector from a plurality of probability vectors and a plurality of combination ratios. The composite feature vector is configured by a plurality of numerical values (vector components) corresponding to the plurality of reference objects. The configuration and the calculation method of the composite feature vector are not limited. In one example, the number of dimensions of the composite feature vector matches the number of reference objects. That is, the composite feature vector has the same structure as the probability vector.

It is assumed that the number of component objects is set to in, and the number of reference objects is set to n. It is also assumed that the probability vectors of individual component objects are represented by $Vp_1, Vp_2, \ldots, Vp_m$. Each probability vector is n-dimensional. In addition, it is assumed that the combination ratios of individual component objects are denoted by $r_1, r_2, \ldots, r_m$. Under these assumptions, in one example, the ratio application unit 14 calculates an n-dimensional composite feature vector Vc by using the following Equation (1).

$$Vc = r_1 \times Vp_1 + r_2 \times Vp_2 + \ldots + r_m \times Vp_m \qquad (1)$$

In the example of FIG. 4, the ratio application unit 14 calculates the composite feature vector Vc as $\{0.34, 0.66\}$ by the following calculation.

$$Vc = 0.7 \times \{0.4, 0.6\} + 0.3 \times \{0.2, 0.8\} = \{0.28, 0.42\} + \{0.06, 0.24\} = \{0.34, 0.66\}$$

In step S16, the ratio application unit 14 outputs the composite feature vector. In the present embodiment, the ratio application unit 14 outputs the composite feature vector to the prediction unit 15 for subsequent processing in the information processing system 10. However, the method of outputting the composite feature vector is not limited to this, and may be designed according to an any policy. For example, the ratio application unit 14 may store the composite feature vector in a given database, or may transmit the composite feature vector to another computer or computer system, or may display the composite feature vector on a display device.

In step S17, the prediction unit 15 calculates a predicted value of the characteristics of the composite object from the composite feature vector. The prediction method is not limited, and may be designed according to an any policy. For example, the prediction unit 15 may calculate the predicted value from the composite feature vector by the third machine learning. Specifically, the prediction unit 15 calculates a predicted value by inputting the composite feature vector into the third machine learning model. The third machine learning model is not limited, and may be determined according to an any policy in consideration of factors such as the type of the composite object. For example, the prediction unit 15 may perform the third machine learning by using an any neural network to solve a regression problem or a classification problem. Typically, the predicted value of the regression problem is expressed numerically, and the predicted value of the classification problem indicates a category. The prediction unit 15 may calculate the predicted value by using a method other than machine learning.

In step S18, the prediction unit 15 outputs the predicted value. The method of outputting the predicted value is not limited. For example, the prediction unit 15 may store the predicted value in a given database, or may transmit the predicted value to another computer or computer system, or may display the predicted value on a display device. Alternatively, the prediction unit 15 may output the predicted value to another functional element for subsequent processing in the information processing system 10.

Program

An information processing program for causing a computer or a computer system to function as the information processing system 10 includes a program code for causing the computer system to function as the acquisition unit 11, the first learning unit 12, the second learning unit 13, the ratio application unit 14, and the prediction unit 15. The information processing program may be provided after being fixedly recorded on a tangible recording medium such as a CD-ROM, a DVD-ROM, or a semiconductor memory. Alternatively, the information processing program may be provided through a communication network as a data signal superimposed on a carrier wave. The provided information processing program is stored in, for example, the auxiliary storage unit 103. Each of the functional elements described above is realized by the processor 101 reading the information processing program from the auxiliary storage unit 103 and executing the information processing program.

Effect

As described above, an information processing system according to one aspect of the present disclosure includes at least one processor. The at least one processor is configured to: acquire a numerical representation and a combination ratio for each of a plurality of component objects; acquire a numerical representation for each of a plurality of reference objects; calculate a component feature vector of each of the plurality of component objects and a reference feature vector of each of the plurality of reference objects by inputting a plurality of the numerical representations corresponding to the plurality of component objects and a plurality of the numerical representations corresponding to the plurality of reference objects into a first machine learning model; calculate a probability vector indicating a degree of association with each of the plurality of reference objects, for each of the plurality of component objects, by inputting a plurality of the component feature vectors and a plurality of the reference feature vectors into a second machine learning model; calculate a composite feature vector indicating a degree of association with each of the plurality of reference objects, for a composite object obtained by combining the plurality of component objects, based on a plurality of the probability vectors and a plurality of the combination ratios; and output the composite feature vector.

An information processing method according to one aspect of the present invention is executed by an information processing system including at least one processor. The information processing method includes: acquiring a numerical representation and a combination ratio for each of a plurality of component objects; acquiring a numerical representation for each of a plurality of reference objects; calculating a component feature vector of each of the plurality of component objects and a reference feature vector of each of the plurality of reference objects by inputting a plurality of the numerical representations corresponding to the plurality of component objects and a plurality of the numerical representations corresponding to the plurality of reference objects into a first machine learning model; calculating a probability vector indicating a degree of association with each of the plurality of reference objects, for each of the plurality of component objects, by inputting a plurality of the component feature vectors and a plurality of the reference feature vectors into a second machine learning model; calculating a composite feature vector indicating a degree of association with each of the plurality of reference objects, for a composite object obtained by combining the plurality of component objects, based on a plurality of the probability vectors and a plurality of the combination ratios; and outputting the composite feature vector.

An information processing program according to one aspect of the present invention causes a computer to execute: acquiring a numerical representation and a combination ratio for each of a plurality of component objects; acquiring a numerical representation for each of a plurality of reference objects; calculating a component feature vector of each of the plurality of component objects and a reference feature vector of each of the plurality of reference objects by inputting a plurality of the numerical representations corresponding to the plurality of component objects and a plurality of the numerical representations corresponding to the plurality of reference objects into a first machine learning model; calculating a probability vector indicating a degree of association with each of the plurality of reference objects, for each of the plurality of component objects, by inputting a plurality of the component feature vectors and a plurality of the reference feature vectors into a second machine learning model; calculating a composite feature vector indicating a degree of association with each of the plurality of reference objects, for a composite object obtained by combining the plurality of component objects, based on a plurality of the probability vectors and a plurality of the combination ratios; and outputting the composite feature vector.

In such an aspect, features of each component object configuring the composite object are clarified by using the degree of association with each reference object, before considering the combination ratio. It is therefore possible to improve the accuracy of analysis of composite object even in a case where a sufficient amount of data cannot be prepared for the component objects.

In the information processing system according to another aspect, when the number of the plurality of component objects is denoted by m, the number of the plurality of reference objects is denoted by n, each of the plurality of probability vectors is n-dimensional, the plurality of probability vectors are denoted by $Vp_1$, $Vp_2$, . . . , $Vp_m$, the plurality of combination ratios are denoted by $r_1, r_2, \ldots, r_m$, and the composite feature vector is denoted by Vc, the at least one processor may be configured to calculate the composite feature vector by using following Equation (1), $$Vc = r_1 \times Vp_1 + r_2 \times Vp_2 + \ldots + r_m \times Vp_m \qquad (1).$$

In this case, a composite feature vector estimated to be highly accurate can be obtained by a simple calculation.

In the information processing system according to another aspect, the at least one processor may be configured to: calculate a predicted value of characteristics of the composite object by inputting the composite feature vector into the third machine learning model; and output the predicted value. This process makes it possible to accurately calculate the characteristics of the composite object.

In the information processing system according to another aspect, the component object may be a material, and the composite object may be a multi-component substance. In this case, the features of each material configuring the multi-component substance are clarified before considering the combination ratio. It is therefore possible to improve the accuracy of analysis of multi-component substance even in a case where a sufficient amount of data cannot be prepared for the material.

In the information processing system according to another aspect, the material may be a polymer, and the multi-component substance may be a polymer alloy. In this case, the features of each polymer configuring the polymer alloy are clarified before considering the combination ratio. It is therefore possible to improve the accuracy of analysis of polymer alloy even in a case where a sufficient amount of data cannot be prepared for the polymer. There are a huge variety of polymer alloys, and correspondingly, there are a huge variety of polymers. For such polymers and polymer alloys, in general, only some of the possible combinations can be tested, and thus a sufficient amount of data cannot be obtained in many cases. According to this aspect, it is possible to accurately analyze the polymer alloy even in a case where the amount of data is not sufficient as described above.

Modifications

The present invention has been described in detail based on the embodiment. However, the present invention is not limited to the embodiment described above. The present invention can be modified in various ways without departing from its gist.

In the embodiment described above, the information processing system 10 includes the prediction unit 15, but this functional element may be omitted. That is, the process of predicting the characteristics of the composite object may be performed by a computer system different from the information processing system.

The prediction unit may perform the prediction by using other information such as the reference feature vector, in addition to the composite feature vector. Alternatively, the prediction unit may perform the prediction by using the data based on the composite feature vector. For example, the prediction unit may perform the prediction by using the weighted average of the reference feature vector according to the composite feature vector.

The processing procedure of the information processing method executed by at least one processor is not limited to the example in the embodiment described above. For example, some of the steps (processes) described above may be omitted, or the steps may be executed in a different order. In addition, any two or more steps among the above-described steps may be combined, or a part of each step may be modified or deleted. Alternatively, other steps may be executed in addition to each of the above steps. For example, the processing of steps S17 and S18 may be omitted.

In a case of comparing the magnitudes of two numerical values in the information processing system, either of the two criteria of "equal to or greater than" and "greater than" may be used, or either of the two criteria of "equal to or less than" and "less than" may be used. Such criteria selection does not change the technical significance of the process of comparing the magnitudes of two numerical values.

In the present disclosure, the expression "at least one processor performs a first process, performs a second process, . . . , and performs an n-th process" or the expression corresponding thereto shows a concept including a case where an execution subject (that is, a processor) of n processes from the first process to the n-th process changes on the way. That is, this expression shows a concept including both a case where all of the n processes are performed by the same processor and a case where the processor is changed according to an any policy in the n processes.

REFERENCE SIGNS LIST

10: information processing system, 11: acquisition unit, 12: first learning unit, 13: second learning unit, 14: ratio application unit, 15: prediction unit.

The invention claimed is:

1. An information processing system, comprising:
    at least one processor,
    wherein the at least one processor is configured to:
        acquire a numerical representation and a compounding ratio for each of a plurality of first polymers, wherein, for each of the plurality of first polymers, the numerical representation includes a numerical value indicating a chemical structure of a first polymer;
        acquire a numerical representation for each of a plurality of second polymers, wherein, for each of the plurality of second polymers, the numerical representation includes a numerical value indicating a chemical structure of a second polymer;
        generate a first trained machine learning model by executing and repeating a first machine learning process comprising:
            inputting a first input vector into a first untrained machine learning model to calculate a first output vector;
            calculating a first estimation result from the first output vector;
            calculating a first difference between the first estimation result and a first ground truth; and
            updating a first parameter of the first untrained machine learning model based on the first difference;
        calculate a first feature vector of each of the plurality of first polymers and a second feature vector of each of the plurality of second polymers by inputting a plurality of the numerical representations corresponding to the plurality of first polymers and a plurality of the numerical representations corresponding to the plurality of second polymers into the first trained machine learning model;
        generate a second trained machine learning model by executing and repeating a second machine learning process comprising:

inputting a second input vector into a second untrained machine learning model to calculate a second output vector;

calculating a second estimation result from the second output vector;

calculating a second difference between the second estimation result and a second ground truth; and updating a second parameter of the second untrained machine learning model based on the second difference;

calculate a probability vector indicating a degree of association with each of the plurality of second polymers, for each of the plurality of first polymers, by inputting a plurality of the first feature vectors and a plurality of the second feature vectors into the second trained machine learning model, wherein the second trained machine learning model is one selected from a group consisting of an attention recurrent neural network (RNN) model and a multi-head attention model, each configured to calculate the probability vector while taking into account an influence of a combination of the plurality of the first feature vectors and the plurality of the second feature vectors;

calculate a composite feature vector indicating a degree of association with each of the plurality of second polymers, for a polymer alloy obtained by combining the plurality of first polymers, based on a plurality of the probability vectors and a plurality of the compounding ratios, wherein the at least one processor is further configured to:

cause a dimensionality of the probability vector to match a number of the plurality of second polymers; and cause a structure of the composite feature vector to be identical to a structure of the probability vector;

calculate a predicted value of a characteristic of the polymer alloy by inputting the composite feature vector into a third trained machine learning model, wherein the predicted value indicates at least one of glass transition temperature and elastic modulus; and cause a display device to display the predicted value.

2. The information processing system according to claim 1, wherein when the number of the plurality of first polymers is denoted by m, the number of the plurality of second polymers is denoted by n, each of the plurality of probability vectors is n-dimensional, the plurality of probability vectors are denoted by $Vp_1, Vp_2, \ldots, Vp_m$, the plurality of compounding ratios are denoted by $r_1, r_2, \ldots, r_m$, and the composite feature vector is denoted by Vc, the at least one processor is configured to calculate the composite feature vector by using following Equation (1), $$V_c = r_1 \times Vp_1 + r_2 \times Vp_2 + \ldots + r_m \times Vp_m \quad (1)$$

3. An information processing method executed by an information processing system including at least one processor, the method comprising:

acquiring a numerical representation and a compounding ratio for each of a plurality of first polymers, wherein, for each of the plurality of first polymers, the numerical representation includes a numerical value indicating a chemical structure of a first polymer;

acquiring a numerical representation for each of a plurality of second polymers, wherein, for each of the plurality of second polymers, the numerical representation includes a numerical value indicating a chemical structure of a second polymer;

generating a first trained machine learning model by executing and repeating a first machine learning process comprising:

inputting a first input vector into a first untrained machine learning model to calculate a first output vector;

calculating a first estimation result from the first output vector;

calculating a first difference between the first estimation result and a first ground truth; and updating a first parameter of the first untrained machine learning model based on the first difference;

calculating a first feature vector of each of the plurality of first polymers and a second feature vector of each of the plurality of second polymers by inputting a plurality of the numerical representations corresponding to the plurality of first polymers and a plurality of the numerical representations corresponding to the plurality of second polymers into the first trained machine learning model;

generating a second trained machine learning model by executing and repeating a second machine learning process comprising:

inputting a second input vector into a second untrained machine learning model to calculate a second output vector;

calculating a second estimation result from the second output vector;

calculating a second difference between the second estimation result and a second ground truth; and updating a second parameter of the second untrained machine learning model based on the second difference;

calculating a probability vector indicating a degree of association with each of the plurality of second polymers, for each of the plurality of first polymers, by inputting a plurality of the first feature vectors and a plurality of the second feature vectors into the second trained machine learning model, wherein the second trained machine learning model is one selected from a group consisting of an attention recurrent neural network (RNN) model and a multi-head attention model, each configured to calculate the probability vector while taking into account an influence of a combination of the plurality of the first feature vectors and the plurality of the second feature vectors;

calculating a composite feature vector indicating a degree of association with each of the plurality of second polymers, for a polymer alloy obtained by combining the plurality of first polymers, based on a plurality of the probability vectors and a plurality of the compounding ratios, wherein the at least one processor is configured to:

cause a dimensionality of the probability vector to match a number of the plurality of second polymers; and cause a structure of the composite feature vector to be identical to a structure of the probability vector;

calculating a predicted value of a characteristic of the polymer alloy by inputting the composite feature vector into a third trained machine learning model, wherein the predicted value indicates at least one of glass transition temperature and elastic modulus; and causing a display device to display the predicted value.

4. A non-transitory computer-readable storage medium storing an information processing program causing a computer to execute:

acquiring a numerical representation and a compounding ratio for each of a plurality of first polymers, wherein, for each of the plurality of first polymers, the numerical representation includes a numerical value indicating a chemical structure of a first polymer;

acquiring a numerical representation for each of a plurality of second polymers, wherein, for each of the plurality of second polymers, the numerical representation includes a numerical value indicating a chemical structure of a second polymer;

generating a first trained machine learning model by executing and repeating a first machine learning process comprising:

inputting a first input vector into a first untrained machine learning model to calculate a first output vector;

calculating a first estimation result from the first output vector;

calculating a first difference between the first estimation result and a first ground truth; and updating a first parameter of the first untrained machine learning model based on the first difference;

calculating a first feature vector of each of the plurality of first polymers and a second feature vector of each of the plurality of second polymers by inputting a plurality of the numerical representations corresponding to the plurality of first polymers and a plurality of the numerical representations corresponding to the plurality of second polymers into the first trained machine learning model;

generating a second trained machine learning model by executing and repeating a second machine learning process comprising:

inputting a second input vector into a second untrained machine learning model to calculate a second output vector;

calculating a second estimation result from the second output vector;

calculating a second difference between the second estimation result and a second ground truth; and updating a second parameter of the second untrained machine learning model based on the second difference;

calculating a probability vector indicating a degree of association with each of the plurality of second polymers, for each of the plurality of first polymers, by inputting a plurality of the first feature vectors and a plurality of the second feature vectors into the second trained machine learning model, wherein the second trained machine learning model is one selected from a group consisting of an attention recurrent neural network (RNN) model and a multi-head attention model, each configured to calculate the probability vector while taking into account an influence of a combination of the plurality of the first feature vectors and the plurality of the second feature vectors;

calculating a composite feature vector indicating a degree of association with each of the plurality of second polymers, for a polymer alloy obtained by combining the plurality of first polymers, based on a plurality of the probability vectors and a plurality of the compounding ratios, wherein the information processing program further causing the computer to:

cause a dimensionality of the probability vector to match a number of the plurality of second polymers; and cause a structure of the composite feature vector to be identical to a structure of the probability vector;

calculating a predicted value of a characteristic of the polymer alloy by inputting the composite feature vector into a third trained machine learning model, wherein the predicted value indicates at least one of glass transition temperature and elastic modulus; and causing a display device to display the predicted value.

* * * * *